(12) United States Patent
Bozek et al.

(10) Patent No.: US 8,997,038 B2
(45) Date of Patent: Mar. 31, 2015

(54) SYSTEMS AND METHODS FOR BUILDING AND DEPLOYING MOBILE APPLICATIONS

(71) Applicant: Anypresence, Inc., Herndon, VA (US)

(72) Inventors: Jeff Bozek, Reston, VA (US); Richard Mendis, Herndon, VA (US); Rakesh Rao, Reston, VA (US); Ian Terrell, Berkeley, CA (US)

(73) Assignee: AnyPresence, Inc., Herndon, VA (US)

( * ) Notice: Subject to any disclaimer, the term of this patent is extended or adjusted under 35 U.S.C. 154(b) by 0 days.

(21) Appl. No.: 13/767,433

(22) Filed: Feb. 14, 2013

(65) Prior Publication Data
US 2013/0262626 A1    Oct. 3, 2013

Related U.S. Application Data

(60) Provisional application No. 61/618,157, filed on Mar. 30, 2012.

(51) Int. Cl.
 *G06F 9/44* (2006.01)
 *H04L 29/08* (2006.01)
 *H04W 4/00* (2009.01)

(52) U.S. Cl.
 CPC ...... *H04L 67/10* (2013.01); *G06F 8/35* (2013.01); *H04W 4/001* (2013.01); *H04W 4/003* (2013.01)
 USPC ........................................................ 717/106

(58) Field of Classification Search
 None
 See application file for complete search history.

(56) References Cited

U.S. PATENT DOCUMENTS

| | | | |
|---|---|---|---|
| 6,199,195 B1 * | 3/2001 | Goodwin et al. | 717/104 |
| 7,444,314 B2 * | 10/2008 | Rouvellou et al. | 706/47 |
| 8,261,231 B1 * | 9/2012 | Hirsch et al. | 717/100 |
| 8,291,408 B1 * | 10/2012 | Czymontek | 717/178 |
| 8,438,537 B2 * | 5/2013 | Becker et al. | 717/120 |
| 2004/0039975 A1 * | 2/2004 | Kounik et al. | 714/741 |
| 2004/0148586 A1 * | 7/2004 | Gilboa | 717/108 |
| 2004/0250238 A1 * | 12/2004 | Singh et al. | 717/108 |
| 2004/0255268 A1 * | 12/2004 | Meijer et al. | 717/106 |
| 2005/0216282 A1 * | 9/2005 | Chen et al. | 705/1 |
| 2006/0212543 A1 * | 9/2006 | O'Farrell et al. | 709/219 |
| 2007/0006149 A1 * | 1/2007 | Resnick et al. | 717/116 |
| 2008/0046557 A1 * | 2/2008 | Cheng | 709/224 |
| 2008/0160967 A1 * | 7/2008 | Narasimhan et al. | 455/414.1 |
| 2010/0037206 A1 * | 2/2010 | Larimore et al. | 717/109 |
| 2010/0050152 A1 * | 2/2010 | Gilboa | 717/106 |
| 2010/0281475 A1 * | 11/2010 | Jain et al. | 717/172 |
| 2011/0066999 A1 * | 3/2011 | Rabinovich et al. | 717/104 |
| 2012/0036494 A1 * | 2/2012 | Gurumohan et al. | 717/106 |

* cited by examiner

*Primary Examiner* — Jason Mitchell
(74) *Attorney, Agent, or Firm* — DLA Piper LLP (US)

(57) ABSTRACT

Systems and methods may generate applications for operating platforms. A data source for an application definition may be created, and an object may be mapped to the data source. An application definition may be generated from the data source and object. An operating platform for application publication may be selected from among a plurality of platforms. An application may be generated for the selected operating platform.

34 Claims, 8 Drawing Sheets

SYSTEMS AND METHODS FOR BUILDING AND DEPLOYING MOBILE APPLICATIONS

CROSS REFERENCE TO RELATED APPLICATION

This disclosure claims priority from U.S. Provisional App. Ser. No. 61/618,157, entitled "System and Method for Building and Deploying Web-Based Mobile Applications Across Multiple Mobile Platforms From a Single Application Definition," filed Mar. 30, 2012, the entirety of which is incorporated by reference herein.

DETAILED DESCRIPTION OF SEVERAL EMBODIMENTS

Figure 1:
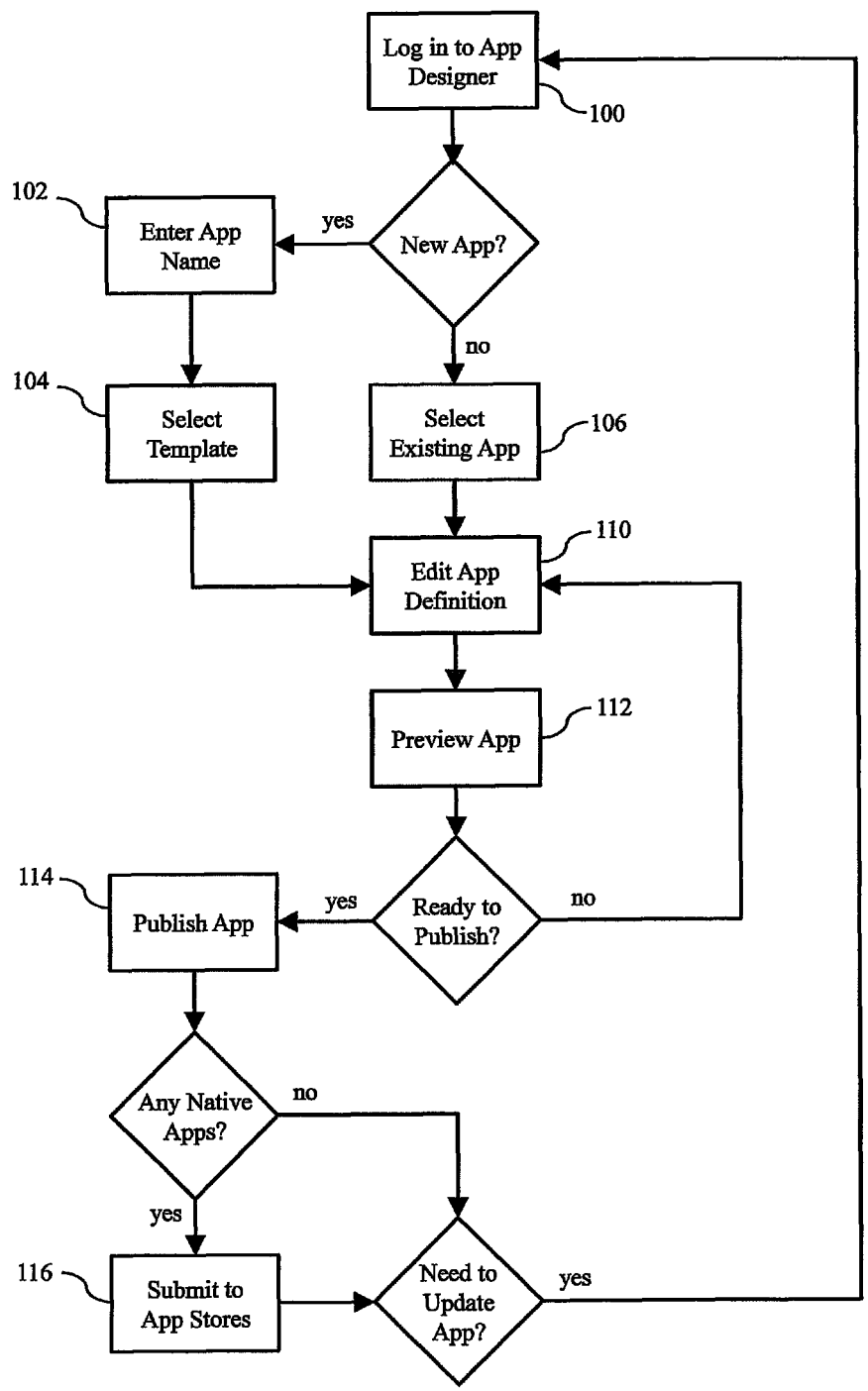
FIG. 1 is an example flow chart of a mobile application creation and deployment process according to an embodiment of the invention.

A mobile application development platform may enable mobile application development by using an interface, for example a web browser-based interface, to assemble and generate applications that may run on multiple mobile operating systems and/or mobile web browsers, from a single application definition which may include mappings between user interface pages and components, objects, extensions, and/or data sources. One example of a mobile application that can be developed by the platform is an application that displays projects and their corresponding tasks and team members. The platform can be used to define the data sources, such as a database or a non-mobile third-party application, from which the project management app may read and write data. The platform can be used to define the objects and relationships with the application, such as projects, tasks, and team members, where tasks and team members objects can belong to a project object. Finally, the platform can be used to specify how the user interface should display the objects and enable users to interact with the object data. The platform can be used to generate the project management application for multiple mobile operating systems. For example, the platform can generate source code that is designed to run on Apple iOS devices. In this case, the source code may include an Apple XCode project and corresponding libraries, using a language called Objective-C. This iOS mobile app may be compiled and can be installed and executed on supported iOS devices. The same project management application can be generated to run as a mobile web application running in mobile web browsers. In this case, the platform may also generate source code and corresponding libraries in Javascript, Cascading Style Sheets (CSS), and HTML. This mobile web application can be hosted on a web server and may be accessed via any mobile device via a browser. Other examples and options may be possible, some of which are described in greater detail below.

Systems and methods described herein may enable application designers to preview an application by downloading automatically generated files for use within a web browser and/or on a mobile device. In some embodiments this may be done without manual software compilation steps or installation of mobile operating system-specific software development kits on the application designer's computing device.

Systems and methods described herein may enable developers to add or change functionality of a mobile application by invoking external custom web services, stored procedures, and/or by installing extensions within an application. When installed, these extensions may automatically create additional application definition items such as user interface pages and components, objects, extensions, and/or data sources.

Systems and methods described herein may generate a run-time server application that may communicate with a client-side mobile application to provide supporting functions such as data storage, data integration with source systems, and/or business logic extensions. This run-time server application may be automatically installed on web servers provided by a third party, or may be saved to a third party source code repository from which authorized users can download and install the run-time server application on their own server infrastructure.

The platform may generate run-time source code components that may comprise a fully functional mobile application. For example, the platform may generate: (1) backend server code and programming interfaces, (2) client-side library (SDK) code for accessing the backend server interfaces, and (3) client-side user interface (UI) code. Specifically, in various embodiments, the backend server component may support Ruby on Rails and/or Java Play language frameworks, the SDK component may support Backbone.js, Sencha Touch, iOS, and/or Android language frameworks, and/or the client-side UI component may support jQuery Mobile, iOS, and/or android language frameworks. The client-side SDK code may also include automatically generated documentation that may provide detailed specifications of the available function calls and parameters.

Devices operating the various applications and performing the various processes described herein may comprise one or more computers. Computers may be linked to one another via a network or networks. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via WiFi, WiMax, or other wireless connection). Connections between computers may use any protocols, including connection oriented protocols such as TCP or connectionless protocols such as UDP. Any connection through which at least two computers may exchange data can be the basis of a network.

Figure 5:
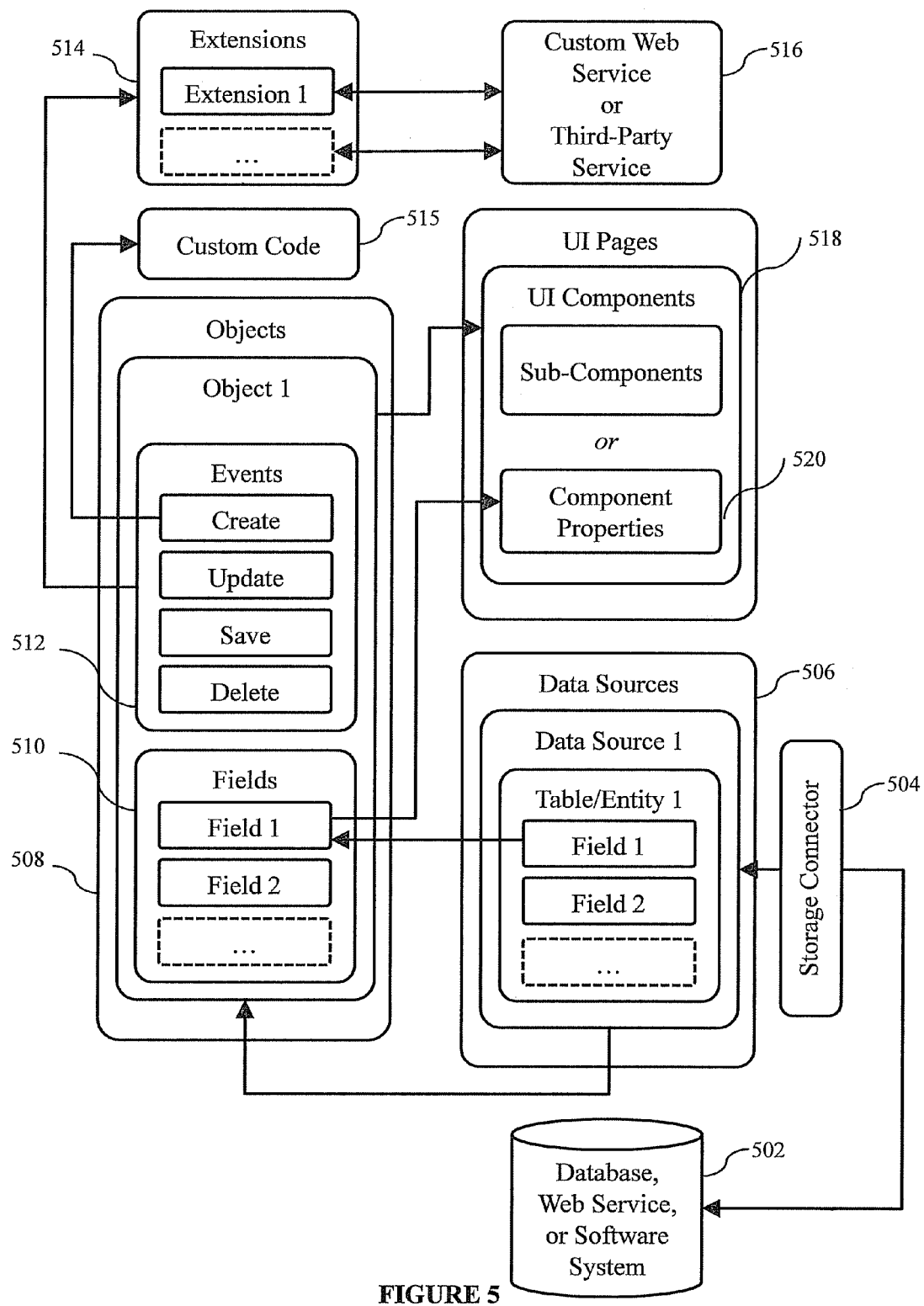
FIG. 5. is an example block diagram of data sources, objects, user interface (UI) components, and extensions that comprise an application definition according to an embodiment of the invention.

Referring to FIG. 1, a platform may provide systems and/or enable methods for building and deploying mobile applications across one or more mobile operating systems. Users may log in to an application designer 100, which may also be referred to as a development environment, via a web browser with Internet connectivity and/or via some other user interface. If a new mobile application is being created, the user may enter a name for the application 102, and may optionally select a template 104 with pre-assembled functionality. The platform may provide access to a plurality of mobile application templates that may be used to reduce development time and/or complexity. Users may also publish new templates that may be made available for selection. In some embodiments, only authorized system administrators of the platform and/or other qualified users may be permitted to publish new templates. When a template is selected, the new application definition may be populated with data sources, objects, extensions, and/or user interface element metadata with relationship mappings that may describe how an application should behave when running. For example, a template may include a pre-defined mobile application for employees to perform common human resources related tasks or requests such as view other employees in a company directory, view news about the company, and/or view personal compensation information. When this template is selected, an application may automatically be created and populated with a series of objects representing entities such as employees, news items, and compensation. In addition, the template may automatically generate user interface components mapped to these objects, such as a home page with news items and tool bar buttons, a company directory list page, and a total compensation list page with chart components. With the basic object and user interface structure now in place, the user may continue to edit the application that was created from the template to ensure it meets the specific requirements of the user's company. A generic example of metadata entities and mappings is shown in FIG. 5, and explained in further detail below.

Referring again to FIG. 1, in addition to creating a new application, the user may be able to select an existing application 106 that was previously created. Once the user creates a new application or selects an existing application, they may be presented with a graphical interface that may allow for visual editing of the application definition 110. As described in greater detail below, after a user has edited the application definition 110, they may preview the application 112. If the user is dissatisfied with the preview, the user may continue editing 110. If the user is satisfied with the preview, the user may publish the application 114. After the application has been published, it may also be submitted to a relevant app store 116 (e.g., an Apple or Google store), based on whether the user desires to distribute the app via a public app store. The published application may be submitted to the relevant app store 116 if it is a native application designed to run specifically on an OS associated with the relevant app store (e.g., iOS app to the Apple store and/or Android app to the Google store), for example. Published applications may also be distributed in other ways. For example, some applications, such as HTML5 mobile applications, may be deployed to users via an Internet URL address and may not require a third party distribution channel. After the app has been published, the user may want to update the app with new functionality, at which point they may restart the process described in FIG. 1. If updates including new functionality are made to native applications, the applications may be re-compiled and re-distributed to end-users via the original channel. There may be end users who delay installing updates to the application, and older versions of server-side APIs may be maintained so that previous versions of native apps will continue to function.

Figure 2:
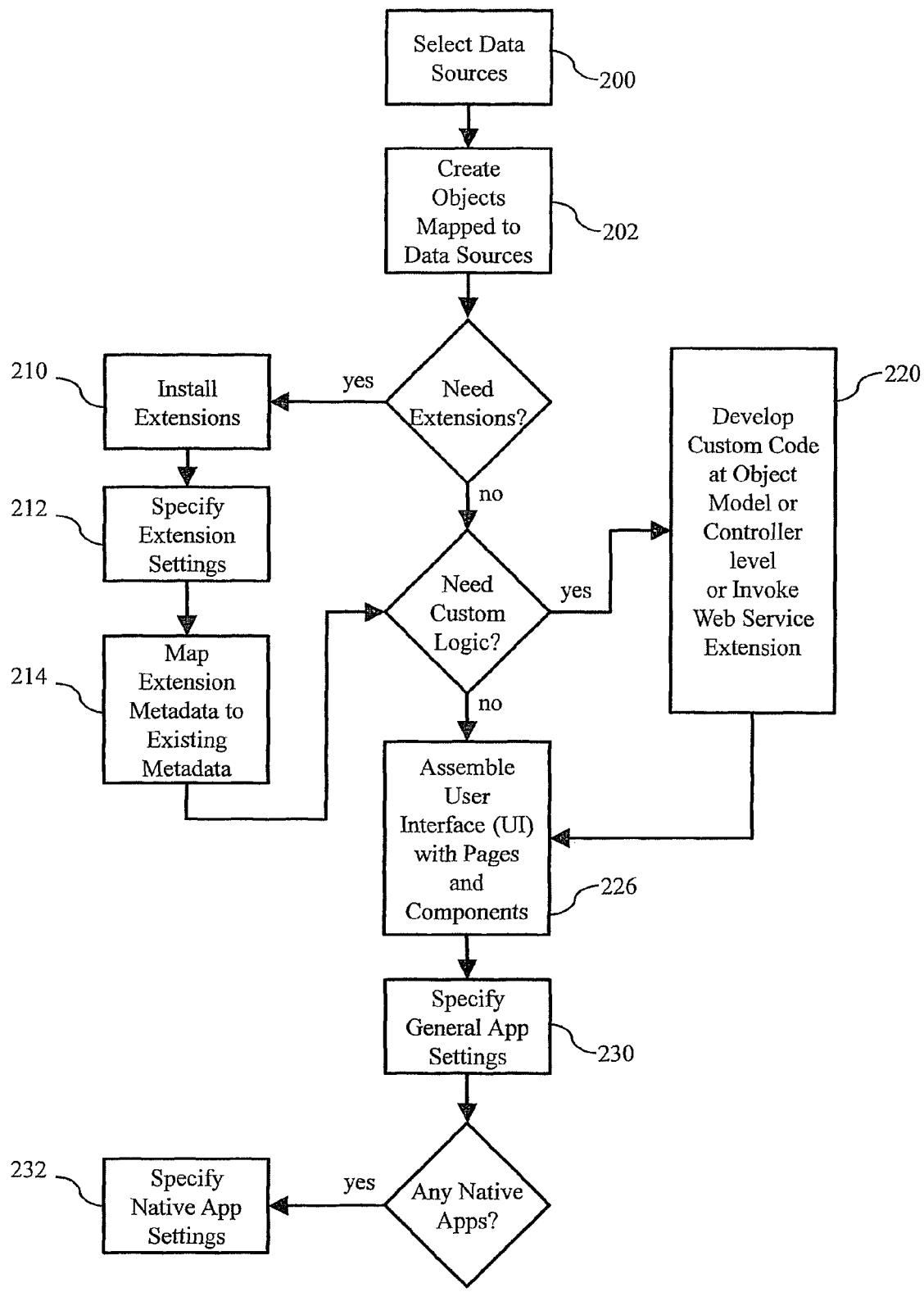
FIG. 2 is an example flow chart of a process for editing a definition of a mobile application according to an embodiment of the invention.

Although the process for editing application definition metadata may be non-linear, the user may follow a predetermined process to create and/or edit the application definition, as described in further detail in FIG. 2.

The process of creating and/or editing the application definition may include creating data sources. Data sources may be locations from which data may be retrieved and/or to which data may be saved by a mobile application. Mobile applications designed for businesses may store and edit information that is contained in a third party application such as an enterprise resource planning (ERP) solution or a customer relationship management (CRM) solution. Examples of data that may be edited or displayed within a typical business mobile application include customers, orders, invoices, and/or activities. In some cases, the mobile application may store or edit data from multiple data sources. As illustrated in FIG. 5, data sources 506 may be linked via storage connectors 504 to databases, web services, and/or software applications 502 such as, but not limited to, MySQL, Postgress, REST or SOAP web services, Oracle e-Business Suite, SAP ERP, and/or Salesforce.com. Storage connectors 504 may be pre-built adapters which may connect to a specific database, web service, and/or software application. For example, to create a data source 506 that is connected to an external MySQL database, a user may employ a MySQL storage connector. The platform may also provide a storage connector 504 to a built-in database, which may be used to save or retrieve data without having to connect to an external data source. Further, users may be able to publish such new storage connectors 504. In some embodiments, only authorized system administrators of the platform and/or other qualified users may be permitted to publish new storage connectors 504 for use in applications. An application designer may specify connectivity parameters within the data source as may be required by the storage connector 504, such as, but not limited to, network address, user name, and/or password. The parameters may be used to establish a connection when a connection is requested and/or needed. As described in greater detail below, the data sources 506 may include and/or be associated with various objects 508, fields 510, events 512, extensions 514, custom or third-party web services 516, UI components 518, and/or UI sub-components or properties 520. FIG. 5 further illustrates the relationships between the metadata entities and their children. Data sources 506 may contain fields or data elements which may be mapped to corresponding fields 510 within an object 508. The object 508 may include lifecycle events 512 based on operations such as create, update, save, and/or delete, which can invoke custom code 515 or extensions 514 that may correspond to custom or third party web services. 516. Furthermore, objects 508 may be mapped to UI components 518 which may expose data within UI component properties 520 that may be mapped to object fields 510.

Referring again to FIG. 2, editing an application definition may begin with the creation of one or more data sources 200. Once data sources are saved, objects may be created and mapped to the data sources 202. As illustrated in the example in FIG. 5, objects 508 may contain fields 510 that may be mapped to corresponding fields on the object's data source. Each object may be mapped to one data source, and each field within an object may be mapped to a single field on a data source. An object may be an abstract representation of a major data element from the data source. For example, if the data source is a customer relationship management (CRM) system, and one of the data elements in the CRM system is customer, an object called "customer" may be mapped to the CRM data source's customer element. The mapping between an object and data source may be one-to-one. An application may have multiple objects that may be mapped to different data sources. Optional query scopes may be defined at the object level. The query scopes may serve to retrieve a subset of data from the data source based on matching field value operations and/or sort orders. Further, a query scope may apply additional rules to filter the data based on the current end-user's attributes, such as, but not limited to, country, language, and/or time zone. This query scope may be referenced when defining user interface elements to enable end-users of a mobile application to interact with specific subsets of data.

An object may optionally be flagged as an authenticatable object with corresponding fields identified that may determine how an individual user of the application may be identified (for example, authentication lookup fields, such as name or email ID), how the user may be authenticated (for example, an authentication match field, such as a password), and/or what role(s) may be assigned to the user (for example, an authorization role field). For example, the authentication object may be mapped to a data source containing user information such as name, password, and/or roles. If at least one authenticatable object exists, then other objects may have authorization rules that may determine which user roles may have access to the object. One or more authorization rules may be defined at the object level, and may specify whether the role can perform operations on specified object field data. These operations may include, for example, reading, writing, creating, updating, and/or deleting data. If no authorization rules exist on an object, which may be true by default in some examples, then all users and roles may have access to perform any operation on the object.

An example of an object and fields representing employee data may be as follows:

```
<object-definition>
  <application-definition-id type="integer">1</application-definition-id>
  <code-friendly-name>Employee</code-friendly-name>
  <composite-key-delimiter>-</composite-key-delimiter>
  <created-at type="datetime">2012-11-17T23:49:26Z</created-at>
  <default-sort-field>last_name</default-sort-field>
  <default-sort-order>Ascending</default-sort-order>
  <display-friendly-name>Employee</display-friendly-name>
  <downcase-lookup-field type="boolean">true</downcase-lookup-field>
  <has-secure-password type="boolean">false</has-secure-password>
  <id type="integer">4</id>
  <lookup-field nil="true"/>
  <mapping>employees</mapping>
  <name>Employee</name>
  <role-field nil="true"/>
  <slug>employee</slug>
  <storage-interface-id type="integer">2</storage-interface-id>
```

-continued

```
  <updated-at type="datetime">2012-11-17T23:49:26Z</updated-at>
</object-definition>
<field-definitions type="array">
  <field-definition>
    <auto type="boolean">true</auto>
    <created-at type="datetime">2012-11-17T23:49:26Z</created-at>
    <display-friendly-name>Id</display-friendly-name>
    <field-type>Integer</field-type>
    <file-type>Image</file-type>
    <file-url type="boolean">false</file-url>
    <id type="integer">21</id>
    <key type="boolean">true</key>
    <mapping>id</mapping>
    <name>id</name>
    <object-definition-id type="integer">4</object-definition-id>
    <required type="boolean">false</required>
    <slug>id</slug>
    <updated-at type="datetime">2012-11-17T23:49:26Z</updated-at>
  </field-definition>
  <field-definition>
    <auto type="boolean">false</auto>
    <created-at type="datetime">2012-11-17T23:49:26Z</created-at>
    <display-friendly-name>Department</display-friendly-name>
    <field-type>String</field-type>
    <file-type>Image</file-type>
    <file-url type="boolean">false</file-url>
    <id type="integer">28</id>
    <key type="boolean">false</key>
    <mapping>department</mapping>
    <name>department</name>
    <object-definition-id type="integer">4</object-definition-id>
    <required type="boolean">false</required>
    <slug>department</slug>
    <updated-at type="datetime">2012-11-17T23:49:26Z</updated-at>
  </field-definition>
  ...
</field-definitions>
```

Figure 6:
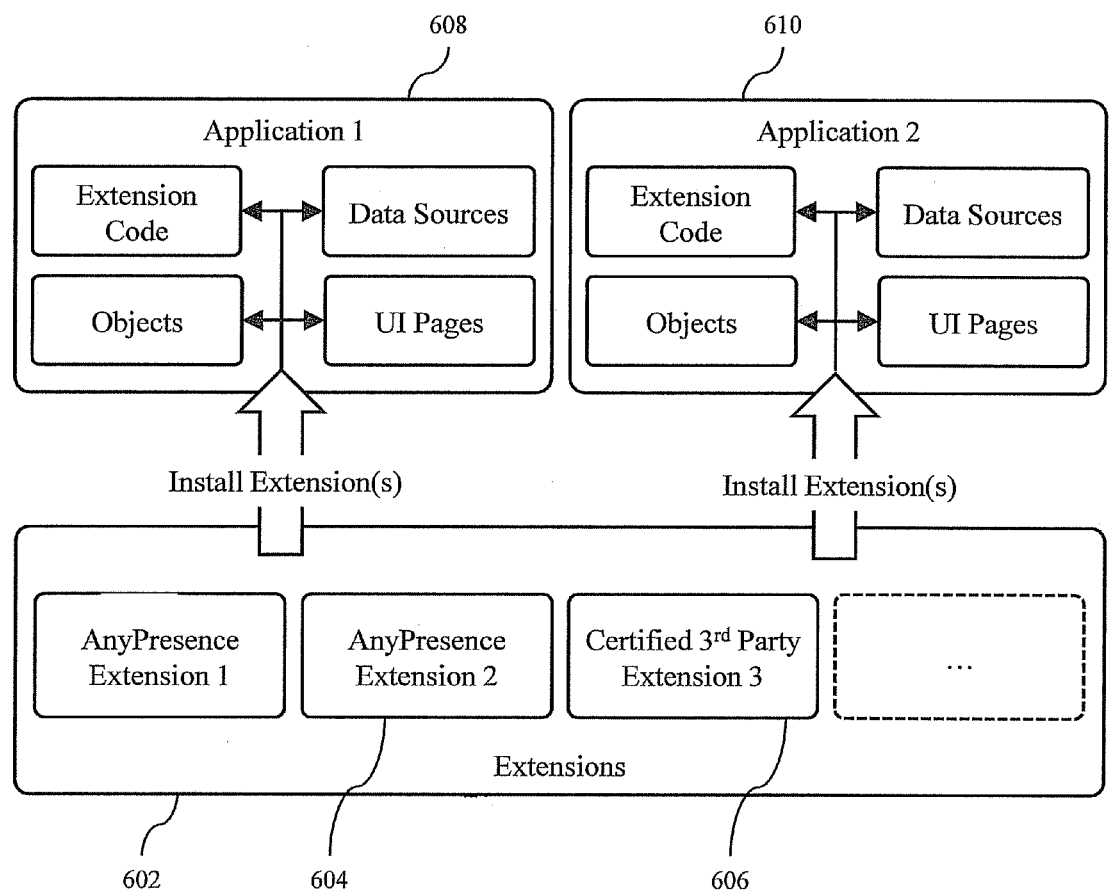
FIG. 6. is an example of a set of extensions and application definitions according to an embodiment of the invention.

In this example, the object metadata fields are as follows:
application-definition-id: a unique identifier for the application
code-friendly-name: the name of the object to be referred to in any code
composite-key-delimiter: character used to build composite keys
created-at: the date when the object for created
default-sort-field: the default field used to sort instances of the object
default-sort-order: the default sort order of the object instances
display-friendly-name: the name of the object to be displayed in the designer
downcase-lookup-field: used when the object is intended for lookup purposes
has-secure-password: used when the object is for authentication
id: unique identifier for the object
lookup: used when the object is intended for lookup purposes
mapping: name of data source component that the object is mapped to
name: human-readable name of the object
role-field: used for access control purposes
slug: the URL-friendly name of the object
storage-interface-id: the identifier of the data source that the object is mapped to
updated-at: the date the object definition was last updated And the field metadata fields are as follows:
field-definition: the start of each field definition and its properties
auto: whether the field is auto created created-at: date the field was created
display-friendly-name: the name of the field to be displayed in the designer
field-type: the data type of the field (i.e. integer, boolean, string, etc.)
file-type: whether the field corresponds to a media file (i.e. picture, audio, etc.)
file-url: the location of the file if the field corresponds to a media file
id: unique identifier for the field
key: whether the field is part of the key for the object
mapping: the name of the data source element that the field maps to
name: the human-readable name of the field
object-definition-id: the unique identifier of the object that the field belongs to
required: whether the field is required Referring again to FIG. 2, once the user has defined data sources and objects, optional extensions 210 may be installed to expand the functionality of the application. An example is an extension that sends Short Message Services (SMS) text messages. Another example is an extension that sends push notifications to native applications via Apple's Push Notification service (APN) or Google's Cloud Messaging for Android (GCM). As illustrated in FIG. 6, extensions 602 may be developed by different parties and may be registered by a user, such as an authorized system administrator, within the platform to become available for use by application designers. For example, extensions may be provided by a platform administrator 604 and/or by a third party 606. The application designer may be able to install one or more extensions within one or more applications 608, 610. When an extension is installed within an application, it may automatically insert application metadata that may include one or more data sources, objects, extension code, and/or user interface elements.

Figure 8:
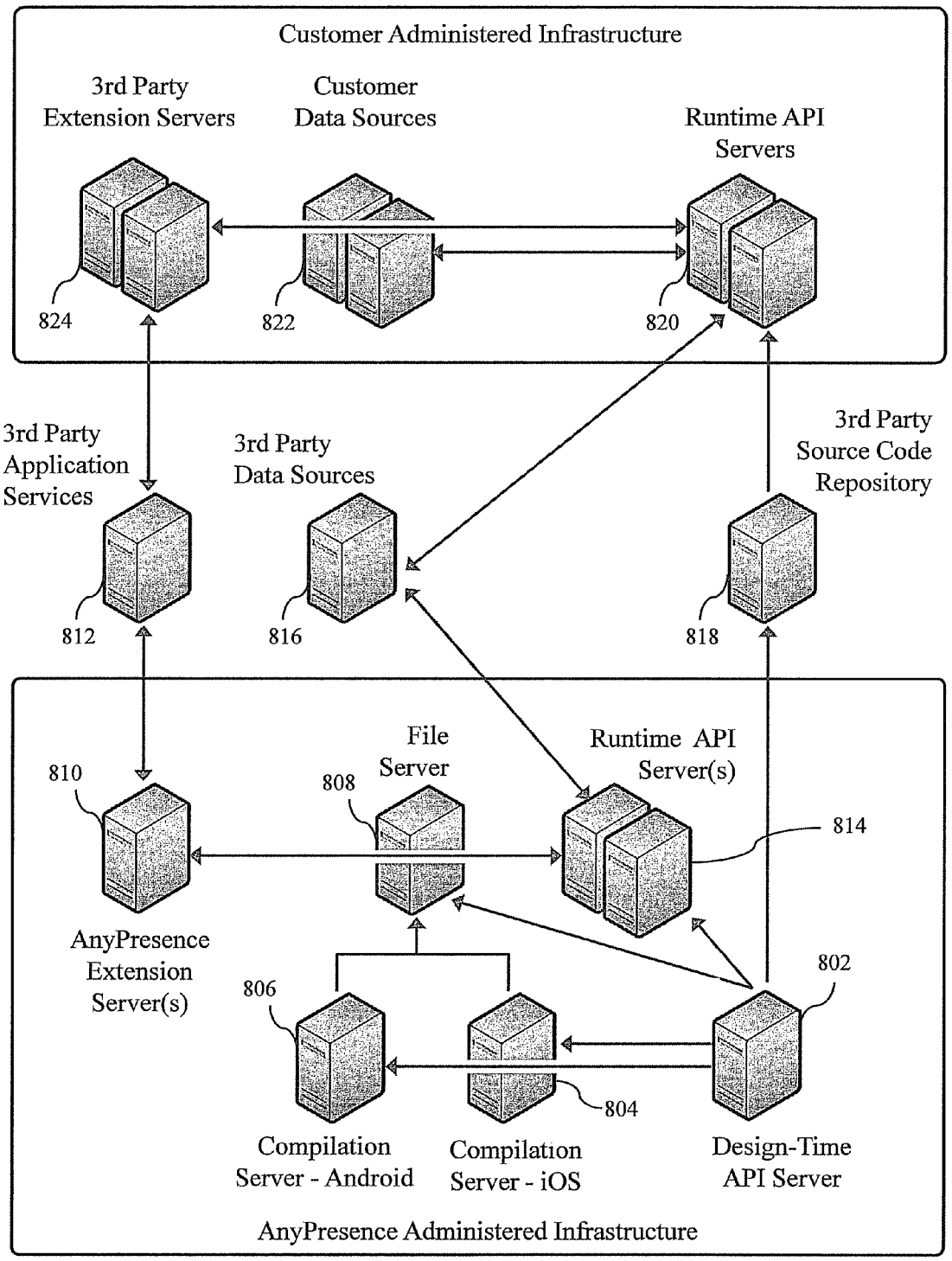
FIG. 8. is an example of infrastructure components and network communication paths according to an embodiment of the invention.

Referring again to FIG. 2, the user may map the extension-generated metadata 214 to other data sources, objects, and/or custom code within the application definition. Further, the extension may expose configuration settings 212 that the user may edit from within the designer user interface. These settings may be extension-specific, and may vary based on the selected extension and any supporting third party services. For example, settings for a push notification extension may include the certificates required by Apple or Google to utilize their messaging delivery services. As illustrated in FIG. 8, extensions developed by a network and/or system operator 810 may be executed on network and/or system operator managed servers 814, and may interact with web-based third party services 812. Extensions may also be developed and hosted by customers or partners of the operator, within their own managed infrastructure 824, which may also interact with web-based third party services 812.

If a user desires further customization of business logic related to extensions or in response to an object event, they may choose to develop custom code at the object model or controller level or invoke a custom web service that was developed outside the platform 220. The web service may be built in any programming language that is able to produce web services based on the Representational State Transfer (REST) model. Custom code may be written within the object's lifecycle events at the controller (before and after requests) and model level using functions such as create update, save, and/or delete. Authoring custom code in this manner may be useful, for example, for implementing custom validation, business logic, pre and post processing requests, default values, and/or invoking extensions. To invoke a custom web service from the application, the user may install a generic web service extension or author custom code that invokes the web service using RESTful protocol, for example. FIG. 5 illustrates an example mapping between object events 512, extensions 514, custom code 515, and the corresponding custom or third party web service 516. An example use of a custom web service could be to update an external system when a user creates a new object instance in a preexisting application. An example use of a third-party service could be to update usage information in a third-party analytics solution in response to user operations within a preexisting application.

Referring again to FIG. 2, the platform may allow a user to assemble the user interface of the application by using page and component elements 226. These user interface components may be visual elements of the application such a list of records with a search button, a form with data entry fields and a submit button, and/or an interactive map of the user's current location. The platform may internally store the user interface (UI) elements, including pages and components, in a hierarchical structure. In the hierarchical structure, the relationship of a UI element to its parent and children, and the attribute values (or properties) of the element, may determine how the UI element will be rendered when the app is running in the client device environment. UI component properties may vary based on the type of component. For example, a button component may have properties that control appearance such as name, width, border radius, background color, and/or font style. A list page component may have properties that determine what data to display, such as object query scope, row header, row body, and/or items per page. FIG. 5 illustrates an example mapping between objects 508 and UI components 518, and between object fields 510 and component properties 520.

Figure 4:
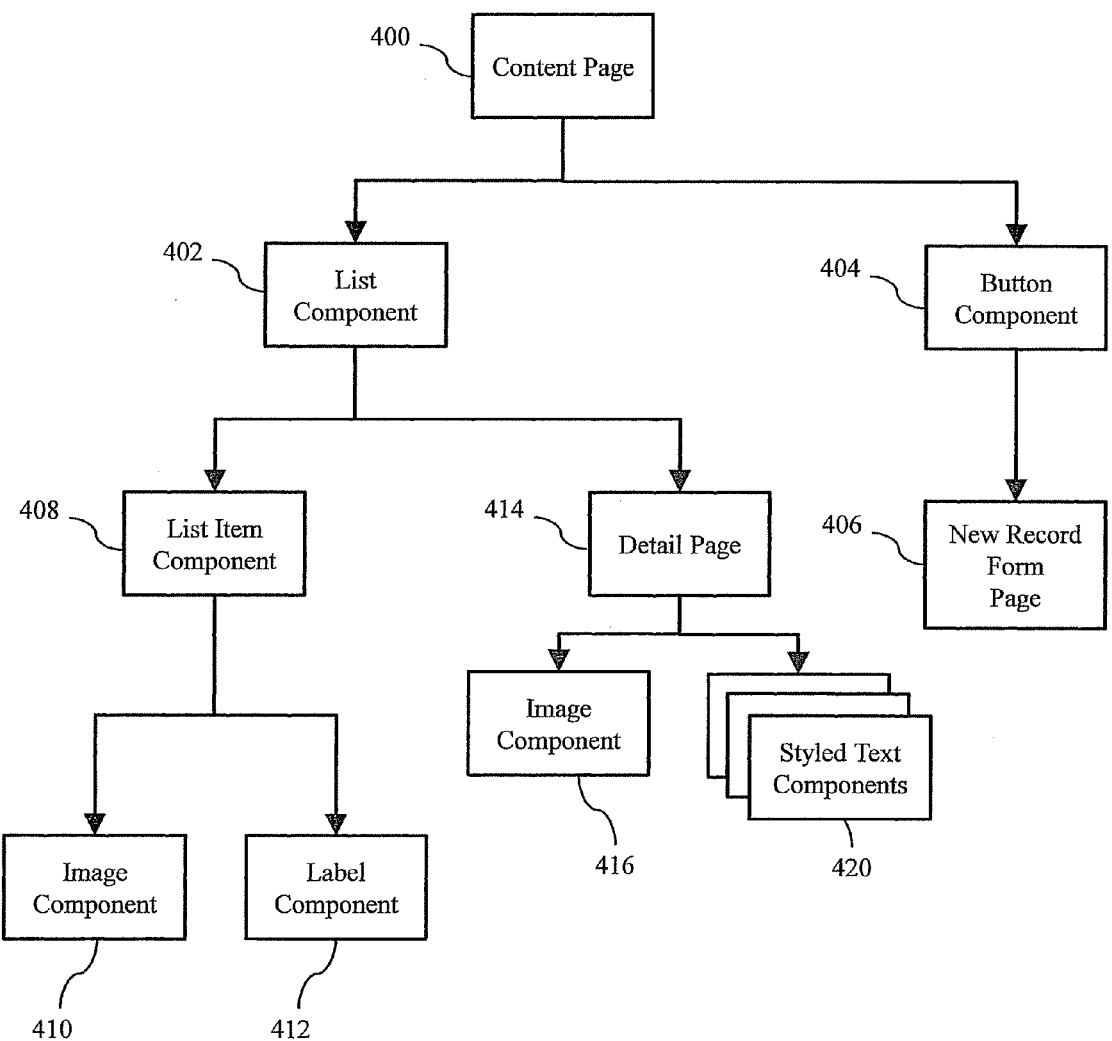
FIG. 4 is an example hierarchy of user interface pages and components that define a mobile application according to an embodiment of the invention.

An example hierarchy of UI elements is illustrated in FIG. 4. A content page 400 may contain a list component 402 and a button component 404. In this example, the list component 402 may render a list of data records based on the object to which the component is mapped. Each record in the list may be displayed according to the list item component 408, which in this example is an image component 410 followed by a label component 412. The button component 404 may enable the end-user to create a new record, and may display a new record form page 406 to allow for input of the new record data. The detail page 414 may display data from an individual record that the end-user may select in the list component 402. The record data may be displayed on the detail page using an image component 416 and one or more styled text components 420. For example, an employee services application may contain a list page called "employee directory" that may be mapped to the employee object's "all" query scope to display all records. The row header property of the list page may display the employee object fields first name and last name. The row body property may display the employee object field title and department. This may result in a list page in a mobile application that displays all employees in a list, with the employee first name, last name, title, and department in each row of the list.

Referring to FIG. 1 and FIG. 2, before previewing 112 or publishing 114 the application, the platform may allow a user to specify general application settings 230 such as, but not limited to, which mobile operating systems may be supported and/or general appearance properties such as color theme and/or icon. If the application is to be generated as a native mobile application, then additional settings 232, such as, but not limited to, ad-hoc provisioning files, private keys, and/or developer certificates, may be specified or uploaded to enable the application to be compiled as a native application on selected mobile operating systems.

Figure 7:
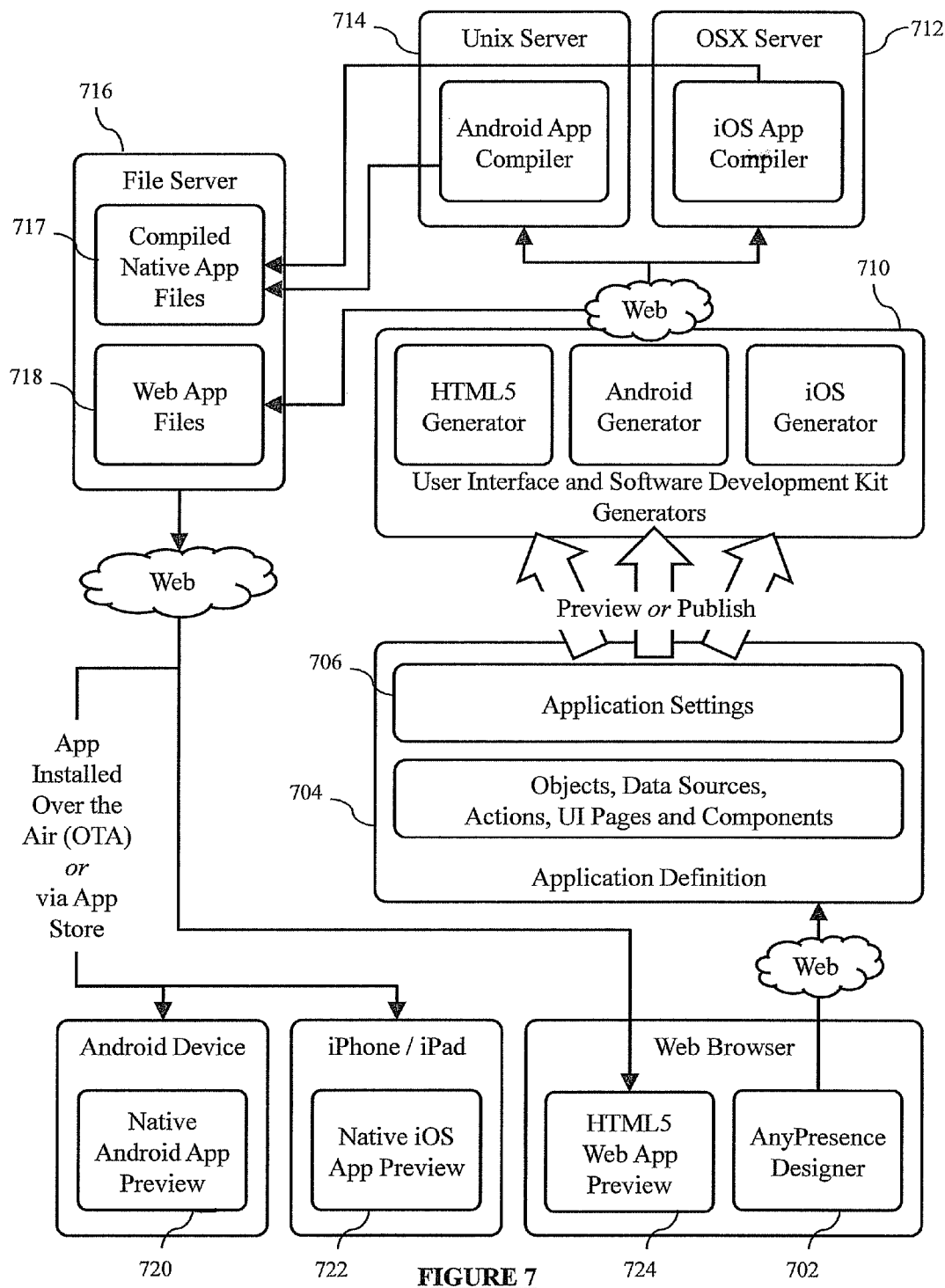
FIG. 7. is an example of components and flow involved during a preview or publishing operation of a mobile application according to an embodiment of the invention.

Referring again to FIG. 1, the platform may allow a user to preview the application 112 based on the current application metadata definitions. Previews may be available for any mobile operating systems that the application may be targeted to support as specified in its general application settings. As illustrated in FIG. 7, the application designer may, for example, click a preview button within a designer user interface 702, which may be a browser-based interface. The user may be able to select from a list of supported mobile operating systems based on the application settings 706, and a selection may initiate a preview process based on the current application metadata definition 704. The platform may include multiple generators 710 that may read the application definition metadata 704 and may automatically create a corresponding mobile application for each supported and/or selected mobile operating system and platform. The generators may be pre-built components of the platform, and may be developed to meet specific requirements of the target mobile platform. Each generator may read application metadata and generate a software development kit (SDK) for a specific mobile platform and a user-interface (UI) for a specific mobile platform. Collectively, the combination of the SDK and UI may be referred to as a generated application. It is possible to also generate only an SDK and develop the UI outside the platform that utilizes the SDK. Furthermore, the platform may be architected to support the addition of newly developed generators as new mobile platforms, such as Microsoft Windows Mobile 8, emerge and become ready to support. The illustration in FIG. 7 depicts three example generators. For example, generators may be provided for mobile platforms such as, but not limited to, HTML5 web applications, Android native applications, and/or iOS native applications. In one example, the generator for HTML5 web apps may copy the assembled output HTML, javascript, and cascading style sheet (CSS) files 718 to a web-based file server 716. The application designer may then preview the HTML5 web application 724 within a web browser. The generators that create native applications may establish connectivity with web-based application compilers such as, but not limited to, a Unix-based server for native Android compilation 714 and/or an OSX server for native iOS compilation 712. Once the compilation servers have completed their tasks, the compiled native application files 717 may be copied to a web-based file server 716. The application designer may then preview the native mobile applications by clicking a web URL that may download and install the applications over a wireless network on a supported mobile device, such as, but not limited to, Android-based devices 720 and/or iOS-based devices 722. Both the compiled native application and the source code may be available for download. The source code can be executed on any computer that has the requisite development tools installed to compile the source code and display the app in a simulator or emulator. The compiled versions of the native application may be installed on any device that has the appropriate certificates to run the application.

Figure 3:
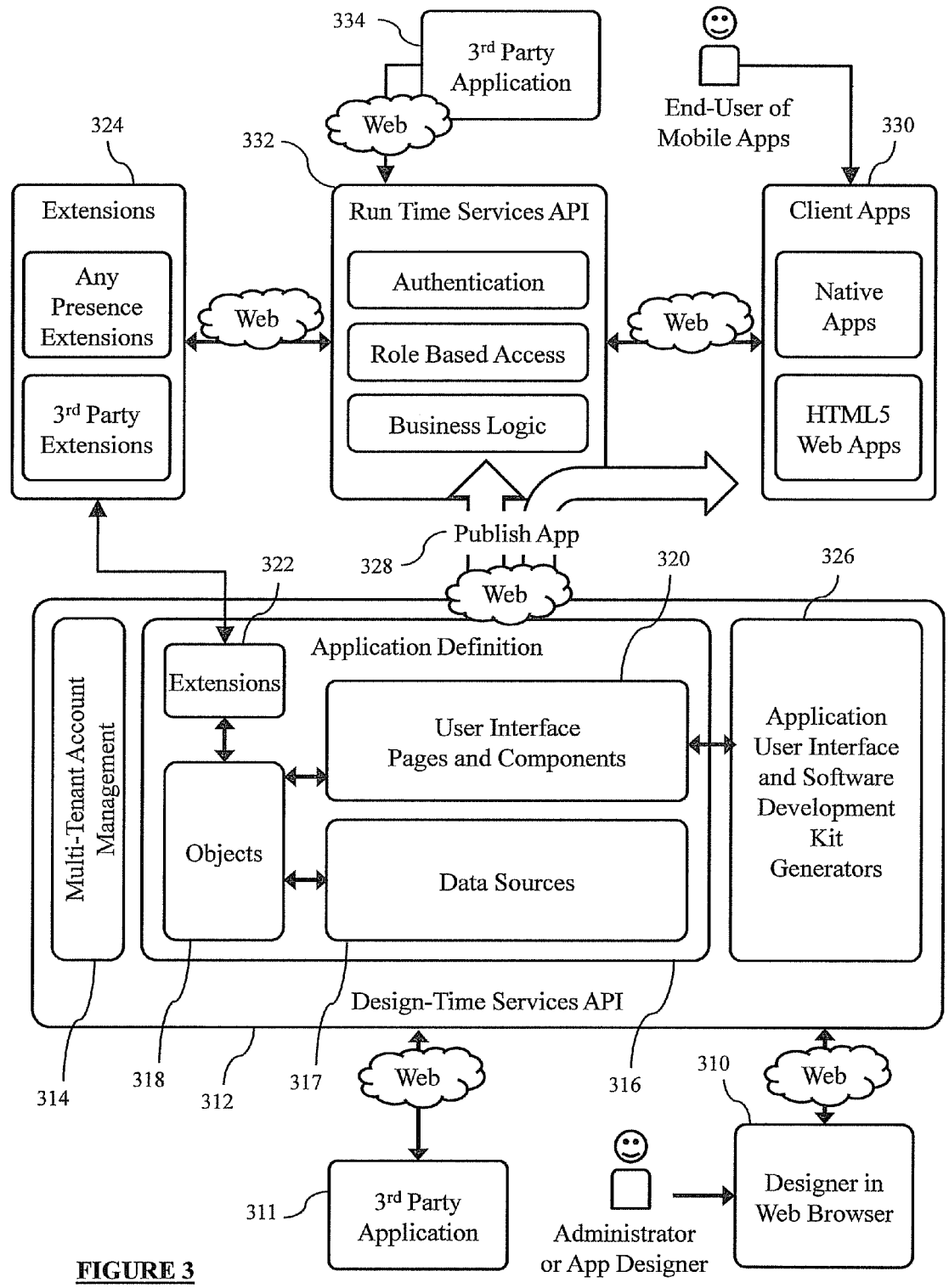
FIG. 3 is an example illustration of architectural components according to an embodiment of the invention.

Referring again to FIG. 1, once the application designer is satisfied with the preview of their application 112, they may choose to publish the application 114 for use by an end-user audience. A user may also choose to publish the application 114 for use by an end-user audience without previewing. As illustrated in FIG. 3, the application designer may click a publish button within the user interface 310, which may be browser-based. This may initiate a publication process based on the current application metadata definition 316. The platform may include multiple generators 326 that may read the application definition metadata 316 and may automatically create new versions of the client mobile applications 330 based on the changed metadata for each mobile operating system and platform that are supported by each generator. When the generator examines the metadata and generates a new application (SDK and UI), the version on the SDK and UI may be incremented. For example, there may be generators 326 for HTML5 web applications, Android native applications, iOS native applications, and/or other applications. A new version of the run-time service application 332 may be generated by the platform based on the metadata definition 316, which may provide supporting functions to the client applications 330 such as, but not limited to, user authentication, role based access, business logic, and/or extension functionality 324. The run-time service application 332 may be a self-contained server-side application that may be further customized by application designers as needed. Customizations to the server-side application can be made by writing custom code on the application objects' model or controller areas, or by editing the generated source code of the server-side application outside the platform. Further, as illustrated in FIG. 8, the run-time server application may be deployed to a network and/or system operator managed servers 814 and/or to servers managed by operator customers or partners 820 via a third-party source code repository 818 that may also manage any optional customizations made by customers or partners to the run-time service application code.

Referring again to FIG. 3, the platform may provide support for authorized third-party applications 311 to connect to the design-time services application programming interface (API) 312 via login to an appropriate account within the multi-tenant design-time environment 314, and may programmatically create or update application definition metadata 316 and may initiate the preview or publishing 328 of a mobile application based on the metadata. For example, this may happen when the platform serves as a mobile application generator for a third party application such as an enterprise resource planning (ERP) solution developed by a third party software vendor. In this example, if the ERP software vendor wants to provide its customers with the ability to generate customized mobile apps that are integrated directly to the ERP solution, the vendor may allow their users to select from a series of options such as which ERP objects and fields to mobile-enable, and then employ the platform design-time services API to programmatically create new application metadata, possibly via the selection of a template, comprising data sources 317, objects 318, user interface components 320, and/or extensions 322. The ERP system can then use the design-time services API to generate the application and provide the user with a link to download and run the generated mobile application. Further, authorized third party applications 334 may also connect to the run-time services API 332 and may programmatically access the same functions and operations available to the mobile client applications 330. This method may be used, for example, to facilitate integration with third party applications such as a corporate intranet or human resources (FIR) application. For example, an employee services mobile app may be used by employees to submit recognition to colleagues in appreciation of a task well done. The corporate intranet application may provide a screen called "Top Employees of the Month" and may connect to the run-time services API to obtain a count of all recognition records across all employees for a given month via the recognition object. The application may then present the intranet user with the top ten employees ranked by recognition count. During the annual review process, the HR application can connect to the run-time services API to obtain a count of all recognition records for a given employee for the year via the recognition object. The application may then present the manager user with the recognition information to be used in the review process. This capability to provide third-party applications, with both a design-time services API to programmatically define an application and a run-time services API to programmatically interface with a generated application, may be enabled by strict architectural separation between the design-time and run-time components of the platform. The design-time components may include the multi-tenant account management layer 314, the application definition metadata 316, and/or the application (user interface and software development kit) generators 326. The run-time components may include the run-time services API 332, installed extensions 324, and/or client-side applications 330 (consisting of a user interface and software development kit), which may run as either a native app within a mobile operating system or a web app within a web browser.

The platform may enable application designers to assemble and deploy mobile applications across multiple mobile operating systems and platforms from a single application metadata definition edited within a web-based graphical user interface. Further, the application may provide mobile-enabled access to data, or subsets thereof, from multiple different data sources, and may include a granular user access system to control permissions at the data field level. Further, the application functionality may be expanded by installing extensions or via event-triggered custom code. Further, the platform may obviate the need for any installation of software development environments by automatically compiling native applications on appropriate web-based servers. Further, the platform may generate a self-contained run-time application server that can be further customized by developers and hosted on server infrastructure chosen by the customer. Further, both the design-time services and run-time services may be accessed programmatically by authorized third-party applications to facilitate data integration or automated mobile application generation.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
    receiving, with a design module running on a processor in communication with a database, data comprising a design for an application definition from a remote computer via a network, the application definition describing a function of an application;
    creating, with a design-time interface of the design module, a data source for the application definition, the data source comprising a definition of a location from which data can be retrieved by the application and/or to which data can be saved by the application;
    mapping, with the design-time interface of the design module, an object to the data source;
    receiving, with the design module, a selection of one or more client operating platforms for application publication from among a plurality of platforms from the remote computer via the network;
    generating, with at least one generator module, uncompiled source code for the application including both source code for a run-time services component employed by all of the selected one or more client operating platforms and source code for a client application component native to each of the selected one or more client operating platforms using the application definition, wherein the application including the run-time services component and the client application component for each of the selected one or more client operating platforms is independent of the design module; and
    sending, with the design module, the uncompiled source code for the application to the remote computer.

2. The method of claim 1, further comprising:
    sending to the remote computer via the network, with the processor, data enabling a display associated with the remote computer to display template information associated with a template; and
    wherein the receiving of the data comprising the design for the application definition comprises receiving data placed in the template.

3. The method of claim 1, further comprising storing, with the processor, the application definition in the database.

4. The method of claim 3, further comprising:
    retrieving, with the processor, the stored application definition from the database;
    receiving, with the processor, data associated with a change to the retrieved application definition; and
    modifying, with the processor, the retrieved application definition by incorporating the received data into the retrieved application definition.

5. The method of claim 3, further comprising:
    generating, with the remote computer, the data associated with the change to the retrieved application definition; and
    sending, with the remote computer, the data associated with the change to the retrieved application definition to the processor via the network.

6. The method of claim 1, further comprising storing the uncompiled source code for the application in the database.

7. The method of claim 1, further comprising:
    generating, with the at least one generator module, a preview application for each of the selected one or more client operating platforms from the application definition; and
    sending to the remote computer via the network data enabling a display associated with the remote computer to display the preview application.

8. The method of claim 1, further comprising:
    receiving, with the processor, data associated with a third-party application;
    integrating, with the processor, the data associated with the third-party application into the application definition.

9. The method of claim 1, wherein the generating of the uncompiled source code for the application comprises installing an extension, generating custom logic, and/or assembling a user interface.

10. The method of claim 1, wherein the generating of the application comprises generating libraries.

11. The method of claim 1, wherein the location defined by the data source comprises a database, a web service, and/or a software application.

12. The method of claim 1, wherein the generating of the uncompiled source code for the application comprises:
incorporating pre-built code into the uncompiled source code for the application;
receiving custom code from the remote computer and incorporating the custom code into the uncompiled source code for the application; or
a combination thereof.

13. The method of claim 1, further comprising:
generating, with the remote computer, the data comprising the design for the application definition; and
sending, with the remote computer, the data comprising the design for the application definition to the processor via the network.

14. The method of claim 1, further comprising compiling, with the least one generator module, the uncompiled source code for the application to generate the application, the application including both the run-time services component and the client application component.

15. The method of claim 14, wherein:
the client application component is configured to be executed by a client; and
the run-time services component is configured to be executed by a server in communication with the client.

16. The method of claim 14, further comprising sending, with the design module, the application to the remote computer.

17. The method of claim 14, further comprising storing the application in the database.

18. A system comprising:
a database;
a processor in communication with the database, the processor constructed and arranged to:
receive data comprising a design for an application definition from a remote computer via a network, the application definition describing a function of an application;
create, with a design-time interface, a data source for the application definition, the data source comprising a definition of a location from which data can be retrieved by the application and/or to which data can be saved by the application;
map, with the design-time interface, an object to the data source;
generate, with the design-time interface, an application definition from the data source and object; and
receive a selection of one or more client operating platforms for application publication from among a plurality of platforms from the remote computer via the network; and
at least one generator module, running on the processor or another processor constructed and arranged to generate uncompiled source code for the application including both source code for a run-time services component employed by all of the selected one or more client operating platforms and source code for a client application component native to each of the selected one or more client operating platforms using the application definition, wherein the application including the run-time services component and the client application component for each of the selected one or more client operating platforms is independent of the design module;
wherein the processor is further constructed and arranged to send the uncompiled source code for the application to the remote computer.

19. The system of claim 18, wherein:
the processor is further constructed and arranged to send, to the remote computer via the network, data enabling a display associated with the remote computer to display template information associated with a template; and
wherein the processor receives data placed in the template.

20. The system of claim 18, wherein the processor is further constructed and arranged to store the application definition in the database.

21. The system of claim 20, wherein the processor is further constructed and arranged to:
retrieve the stored application definition from the database;
receive data associated with a change to the retrieved application definition; and
modify the retrieved application definition by incorporating the received data into the retrieved application definition.

22. The system of claim 21, wherein the remote computer is constructed and arranged to:
generate the data associated with the change to the retrieved application definition; and
send the data associated with the change to the retrieved application definition to the processor via the network.

23. The system of claim 18, wherein the at least one generator module is further constructed and arranged to store the uncompiled source code for the application in the database.

24. The system of claim 18, wherein the at least one generator module is further constructed and arranged to:
generate a preview application for each of the selected one or more client operating platforms from the application definition; and
send, to the remote computer via the network, data enabling a display associated with the remote computer to display the preview application.

25. The system of claim 18, wherein the processor is further constructed and arranged to:
receive data associated with a third-party application;
integrate the data associated with the third-party application into the application design.

26. The system of claim 18, wherein the at least one generator module installs an extension, generates custom logic, and/or assembles a user interface.

27. The system of claim 18, wherein the generating of the application comprises generating libraries.

28. The system of claim 18, wherein the location defined by the data source comprises a database, a web service, and/or a software application.

29. The system of claim 18, wherein the generating of the application comprises:
incorporating pre-built code into the uncompiled source code for the application;
receiving custom code from the remote computer and incorporating the custom code into the uncompiled source code for the application definition; or
a combination thereof.

30. The system of claim 18, wherein the remote computer is constructed and arranged to:
generate the data for the application definition; and
send the data for the application definition to the processor via the network.

31. The system of claim 18, wherein the at least one generator module is further constructed and arranged to compile the uncompiled source code for the application to generate the application, the application including both the run-time services component and the client application component.

32. The system of claim 31, wherein:
the client application component is configured to be executed by a client; and
the run-time services component is configured to be executed by a server in communication with the client.

33. The system of claim 18, wherein the processor is further constructed and arranged to send the application to the remote computer.

34. The system of claim 18, wherein the at least one generator module is further constructed and arranged to store the application in the database.

* * * * *